United States Patent [19]

Sugano et al.

[11] Patent Number: 5,610,679
[45] Date of Patent: Mar. 11, 1997

[54] METHODS OF FILM WINDING AND LOADING A FILM IN A LENS-FITTED FILM UNIT AND A FILM SUPPLYING SPOOL

[75] Inventors: Kazuyoshi Sugano; Kiyohide Ito, both of Hino, Japan

[73] Assignee: Konica Corporation, Japan

[21] Appl. No.: 645,127

[22] Filed: May 13, 1996

[30] Foreign Application Priority Data

May 18, 1995 [JP] Japan ................................. 7-119885

[51] Int. Cl.⁶ .......................... G03B 17/26; G03B 17/02
[52] U.S. Cl. ...................... 396/516; 242/332; 242/332.3; 396/538; 396/387
[58] Field of Search ........................... 354/75, 76, 275, 354/288, 354; 242/332, 332.3, 332.4

[56] References Cited

U.S. PATENT DOCUMENTS

| | | | |
|---|---|---|---|
| 4,555,076 | 11/1985 | Uchiyama | 242/332.3 |
| 4,884,087 | 11/1989 | Mochida et al. | 354/288 |
| 4,954,857 | 9/1990 | Mochida et al. | 354/288 |
| 5,229,802 | 7/1993 | Shiota et al. | 354/275 |

*Primary Examiner*—A. A. Mathews
*Attorney, Agent, or Firm*—Jordan B. Bierman; Bierman and Muserlian

[57] ABSTRACT

A method for loading an unexposed photographic film in a lens-fitted photographic film unit, the method including the steps of: providing a cartridge storing the unexposed film therein, and a film supplying spool having a film winding part around which the film is wound, a portion defining a suction hole for film-attraction formed on the film winding part, and a portion defining a hollow hole for air-suction formed concentrically with the supplying spool; thrusting out the film from the cartridge; sucking air from the hollow hole so that the film thrust out from the cartridge is attracted to the suction hole; winding up the film by a predetermined length to the supplying spool while attracting the film to the suction hole; and loading the cartridge and the supplying spool in a main body of the lens-fitted photographic film unit.

9 Claims, 10 Drawing Sheets

METHODS OF FILM WINDING AND LOADING A FILM IN A LENS-FITTED FILM UNIT AND A FILM SUPPLYING SPOOL

BACKGROUND OF THE INVENTION

The present invention relates to a film winding method, a method of loading a film in a lens-fitted film unit and a film supplying spool, and the invention is especially effective for winding a film whose leading edge is not perforated.

When winding a film on a film supplying spool in the case of a conventional film such as, for example, a 135 film, a film has been wound on a film supplying spool after causing claws provided on the film supplying spool and perforations on the film leading edge to engage with each other, because even a film leading edge has also been perforated. Further, there has been used another method wherein a leading edge of a film was folded to be inserted in a groove provided on a film supplying spool so that the film is wound.

However, in the method wherein a film is wound after claws provided on a film supplying spool and perforations on the leading edge of the film are caused to engage with each other as stated above has caused problems such as that the claws do not come off the perforations easily when removing the film from the film supplying spool and that the film wound in a cartridge is hard to be fed out of the cartridge due to deformation of the perforations when feeding out the film for developing.

In the case of a conventional film, it was able to be wound around a take-up spool despite the above-mentioned problems because the leading edge of the conventional film was perforated. However, the leading edge of a new film which has recently been disclosed in magazines or patent publications is not perforated, resulting in a problem that engagement between perforations and claws such as those in the past is impossible accordingly.

A cartridge wherein the new film is contained is shown in FIG. 1.

As shown in FIG. 1, cartridge C is composed of cartridge main body C1, take-up spool C2, film F taken up on the take-up spool C2, and light-shielding cover C4 that covers film gate C3. The light-shielding cover C4 is supported to rotate freely in the cartridge main body C1, and on one end of the light-shielding cover C4, there is formed key C5. Incidentally, in the present figure, the film gate C3 is not covered by the light-shielding cover C4 so that a film can be fed. On the other hand, when the film gate C3 requires to be shielded by the light-shielding cover C4 against light, key C5 is driven to rotate the light-shielding cover C4 counter-clockwise by about 90° so that the film gate C3 is shielded. Therefore, the film gate C3 needs, when it is taken out to a daylight room, to be shielded by the light-shielding cover C4 without fail, which is different from a conventional cartridge wherein a velvet is provided on a film gate.

As stated above, in a camera employing cartridge C, it is absolutely necessary that film F is totally rewound in cartridge main body C1 and film gate C3 is shielded by light-shielding cover C4 after completion of photographing, because the cartridge is taken out to a daylight room later. Further, this novel film continues to be contained in the cartridge as a negative film even after being processed to be returned to a photographer. On the occasion of reprinting, the negative film is thrust out of the cartridge. Therefore, a film winding wherein a leading edge of a film is folded to be inserted in a groove provided on a film supplying spool can not be applied to this novel film. Namely, when a film leading edge is deformed when it is folded, the film can not be thrust out of cartridge main body C1, which is a reason why the above-mentioned method can not be applied to the novel film.

SUMMARY OF THE INVENTION

With a background of the above-mentioned problem, an object of the invention is to provide a film winding method capable of winding a film on a film supplying spool without deforming a leading edge of the film, and especially a film winding method capable of winding a film whose leading edge is not perforated.

The object mentioned above can be attained by the following items (1)–(3).

(1) A film winding method comprising a film supplying spool having a suction hole for film-attraction that is bored on a film winding portion of the spool and a hollow hole formed in the spool to be in parallel with its axial direction, both the suction hole and the hollow hole being communicated with each other, wherein a film is wound while its leading edge is attracted to the aforesaid suction hole when air is sucked out through the hollow hole of the film supplying spool.

(2) A method of loading a film in a lens-fitted film unit composed of the following steps.

(A) A first step wherein at least a cartridge that houses therein an unexposed film and a film supplying spool having a suction hole for film-attraction that is bored on a film winding portion of the spool and a hollow hole formed concentrically with the spool, both the suction hole and the hollow hole being communicated with each other, are arranged.

(B) A second step wherein a light-shielding cover for a film gate in the aforesaid cartridge is opened in a darkroom and the aforesaid film supplying spool is covered by a film guide having its inside diameter that is greater than an outside diameter of a film winding section of the aforesaid film supplying spool and guiding the film.

(C) A third step wherein, in the darkroom, the film take-up spool in the aforesaid cartridge is rotated to thrust out the film through the film gate of the cartridge, and then a leading edge of the film is inserted in the aforesaid film guide, and thereby the film in a predetermined length is wound while its leading edge is attracted to the aforesaid suction hole when air is sucked through the hollow hole on the film supplying spool.

(D) A fourth step wherein, in the darkroom, air suction through the hollow hole is suspended after the aforesaid film guide is retreated, the film is pressed with a touch roller and the film in a prescribed length is wound.

(E) A fifth step wherein, in the darkroom, the aforesaid cartridge is loaded in a camera main body equipped with camera functions, and the film take-up shaft in the aforesaid camera main body and a film take-up spool of the aforesaid cartridge are caused to engage with each (F) A sixth step wherein, in the darkroom, the aforesaid film supplying spool is loaded in the camera main body, and the film supplying spool takes up the film as completely as possible from the aforementioned cartridge through an external portion of the camera main body.

(G) A seventh step wherein, in the darkroom, a film loosened outside the camera main body is wound inside the camera main body.

(H) An eighth step wherein an external packing member is mounted so that the film may be kept on a light-tight basis.

(3) A film supplying spool having a suction hole for film-attraction that is bored on a film winding portion of the spool and a hollow hole formed in the spool to be in parallel with its axial direction, both the suction hole and the hollow hole being communicated with each other.

DETAILED DESCRIPTION OF THE PREFERRED EMBODIMENT

A method of loading a film in a lens-fitted film unit in the invention will be explained in detail, referring to FIGS. 2–14.

A lens-fitted film unit is a simple camera unit which is available on the market under the state that a film is loaded in it in advance in an assembly step for the camera unit which makes it possible for anybody to photograph immediately because neither film loading nor film rewinding is required for a user. In the case of the lens-fitted film unit, further, it is shipped after a cartridge is loaded therein in its assembly step and an unexposed film is drawn out totally and then is wound around a film supplying spool. Therefore, a user is required to take up the film into a cartridge by one frame for each photographing, and to take the lens-fitted film unit containing therein a film to a camera store after completion of photographing to request processing.

Figure 1:
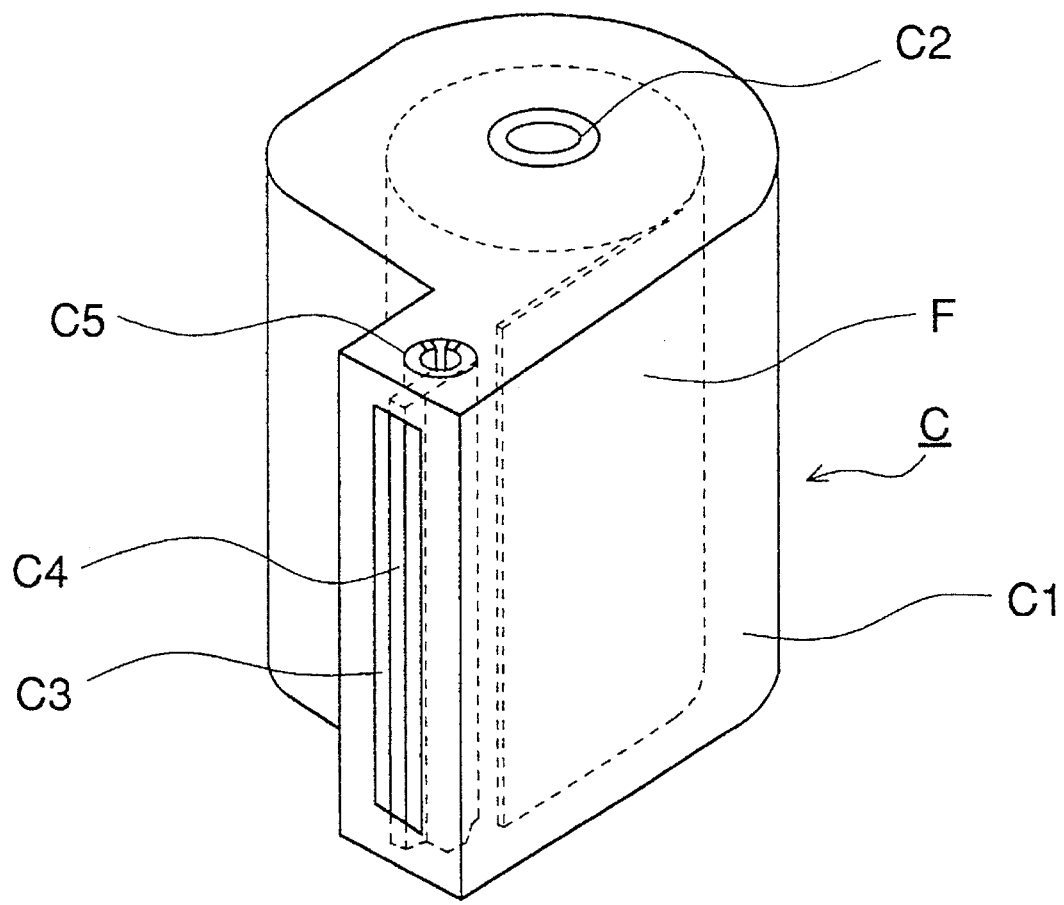
FIG. 1 is a diagram of a cartridge housing therein a novel film.

The present example relates to a lens-fitted film unit employing cartridge C containing therein film F whose leading edge is not perforated as shown in FIG. 1, and it shows assembly steps wherein film F is totally taken out of cartridge C to be wound around a film supplying spool, and then, an external packing is attached and film F is kept on a light-tight basis.

Figure 2:
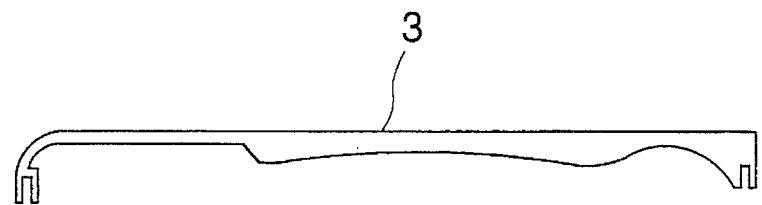
FIG. 2 (A) is a diagram of a member to be prepared in the first step, and FIG. 2 (B) is a side view of member 1.
Figure 2:
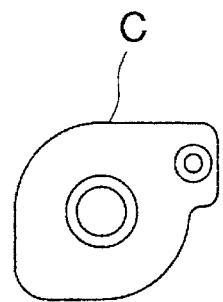
Figure 2:
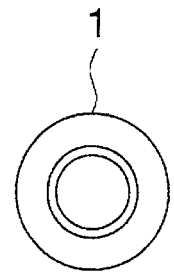
Figure 2:
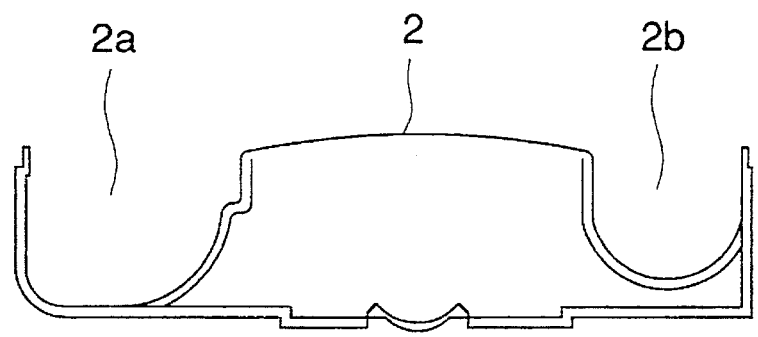
Figure 2:
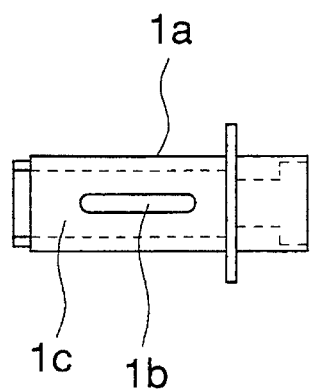

First, as shown in FIG. 2 (A), cartridge C housing therein an unexposed film and film supplying spool 1 on which the film is wound are prepared in the first step. A side view of the film supplying spool 1 is shown in FIG. 2 (B), and on film winding section 1a that takes up a film, there is bored suction hole 1b for attracting a film, then, hollow hole 1c is formed to be in parallel with an axis of the spool, and the suction hole 1b and the hollow hole 1c are communicated with each other, thus, air can be sucked from the hollow hole 1c through the suction hole 1b.

The numeral 2 represents a camera main body which is provided with a camera lens, a shutter unit, a film take-up unit and a viewfinder unit (a flash unit and a battery in the case of a lens-fitted film unit). The numeral 3 is a rear cover which keeps film F on a light-tight basis together with cartridge C and film supplying spool 1. In addition to that, a cartridge cover and a cover for a film winding shaft are needed, but explanations for them will be omitted here.

Incidentally, those other than the cartridge C and the film supplying spool 1 do not need to be prepared in the first step but they may be prepared in a later step where they are needed.

Figure 3:
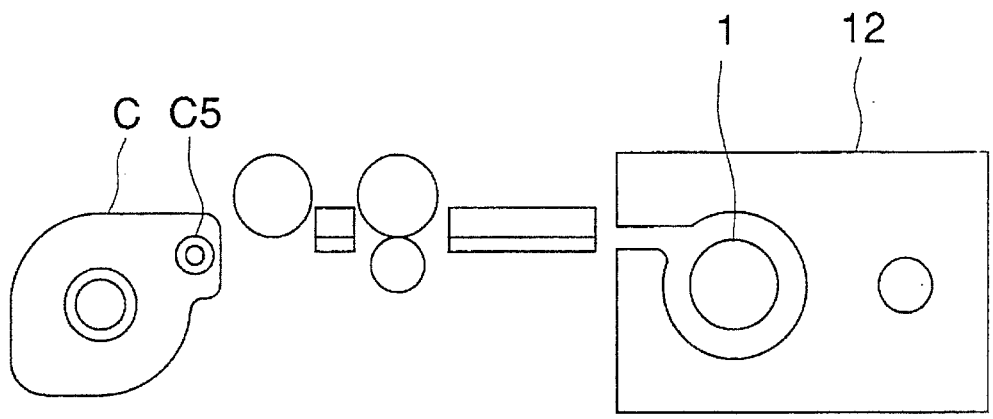
FIG. 3 is a top view of the second step.
Figure 4:
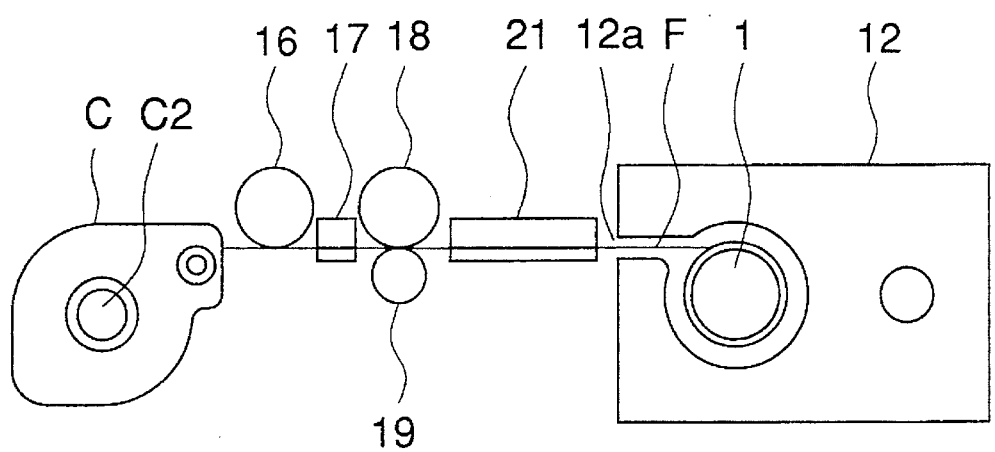
FIG. 4 is a top view of the third step.

The subsequent second and third steps will be explained as follows, referring to FIGS. 3–5. FIG. 3 is a top view of the second step, FIG. 4 is a top view of the third step, and FIG. 5 is a perspective view of the third step, and FIG. 5 is also used for explanation of the second step.

Figure 5:
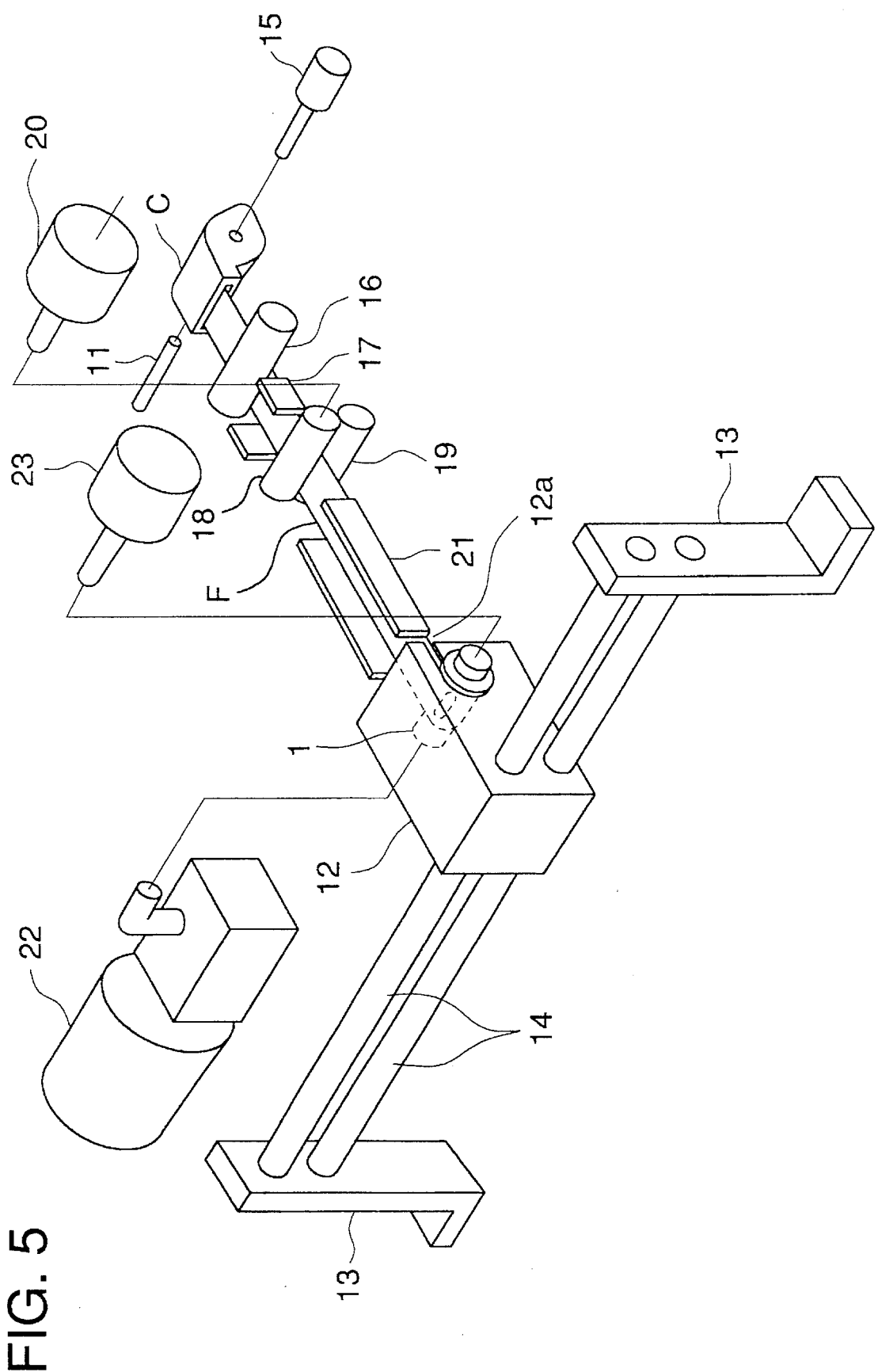
FIG. 5 is a perspective view of the third step.

In the second step, parts prepared in the first step including cartridge C and film supplying spool 1 are moved to places where jigs are set as shown in FIG. 5, so that the cartridge C and film supplying spool 1 may be set as shown in FIG. 5. Incidentally, the jigs set are not illustrated in the figure. Then, after the ambient conditions have been changed to those of a dark room, light-shielding cover opening jig 11 is rotated by about 90° to drive key C5 of the cartridge C so that light-shielding cover C4 located at a film gate of the cartridge C may be opened. On the other hand, film guide 12 for guiding a film is moved to cover the film supplying spool 1. Incidentally, the film guide 12 is structured to be capable of sliding along guide shaft 14 supported by supporting member 13. Then, a suction port of a vacuum pump 22 is connected to hollow hole 1C of the cartridge C.

In the third step, film take-up spool C2 of cartridge C is engaged with film take-up spool jig 15 and thereby is rotated to feed film F out of cartridge C so that the film F may pass through the bottom side of roller 16, first guide 17 that regulates lateral position of the film F, and through the portion between nip rollers 18 and 19. A clearance between the nip rollers 18 and 19 is much greater than the thickness of the film F in the beginning so that a leading edge of the film F can pass through the clearance easily. However, when an unillustrated sensor detects that the leading edge of the film F has passed the clearance, the film F is sandwiched by the nip rollers 18 and 19 vertically. Since the nip roller 18 is driven by motor 20, the film F is transported thereafter by the nip roller 18 to pass through the second guide 21, and the leading edge of the film F is inserted into film guide 12 through its inlet 12a. Incidentally, the film take-up spool jig 15 that is rotated by the film take-up spool C2 retreats after the motor has started driving the nip roller 18.

Before the leading edge of the film F is inserted into the film guide 12 at the latest, the vacuum pump 22 operates to suck from the inside of suction hole 1b through hollow hole 1c of film supplying spool 1. Therefore, the leading edge of the film F is attracted easily to the suction hole 1b of the film supplying spool 1 without being deformed at all, and the film F is wound around winding section 1a when the film supplying spool 1 is rotated by motor 23.

Incidentally, this film winding is called primary film winding, and it is preferable to wind by at least 37 mm. After winding by a predetermined length, driving of the motor 23 is suspended.

Next, an example of suction by means of a vacuum pump will be shown below.

Figure 6:
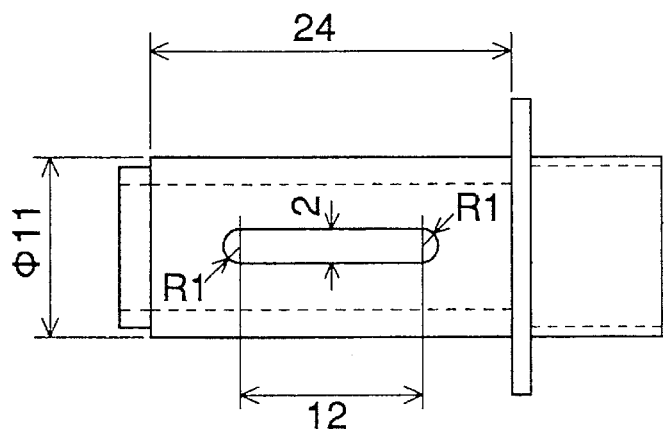
FIG. 6 represents an example of a film winding spool.

As shown in FIG. 6, the film supplying spool has its spool outside diameter of 11 mm and its surface length of 24 mm and it is provided thereon with two slits bored symmetrically as suction holes as shown in the figure. The total area of the two holes in this case is 0.542 cm$^2$, and vacuum pressure of 450 mm Hg and flow rate of 200 l/min. are preferable.

According to experiments of the inventors of the invention, it has been further found that the area of suction holes that is not less than 0.1 cm$^2$ and not more than 1.2 cm$^2$ is preferable.

Figure 7:
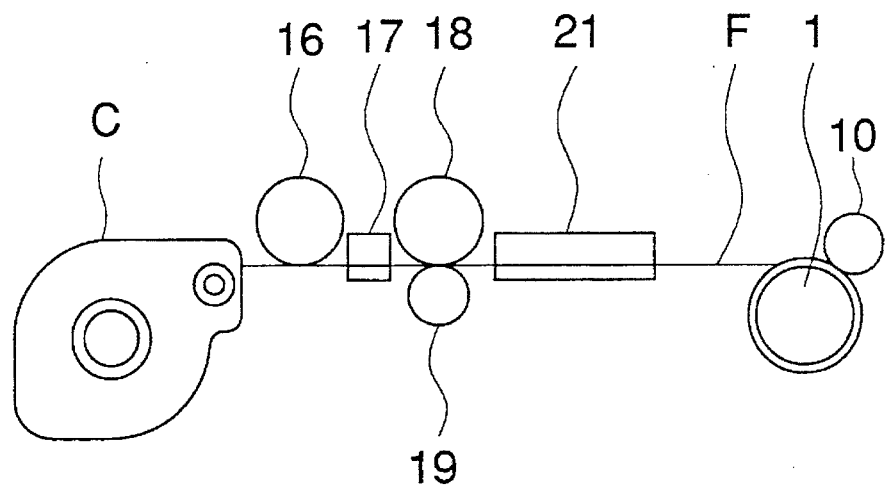
FIG. 7 is a top view of the fourth step.

In the following fourth step, film guide 12 slides and retreats as shown in the top view in FIG. 7, and operation of vacuum pump 22 is suspended after the wound film is pressed with a touch roller 10, and a predetermined length of a film has been wound. This film winding is called secondary film winding, and a length of film winding in this case needs to be the length which does not cause a problem of film loosening even when the operation of vacuum pump 22 is stopped, and that of not less than 150 mm and not more than 200 mm is preferable.

Figure 8:
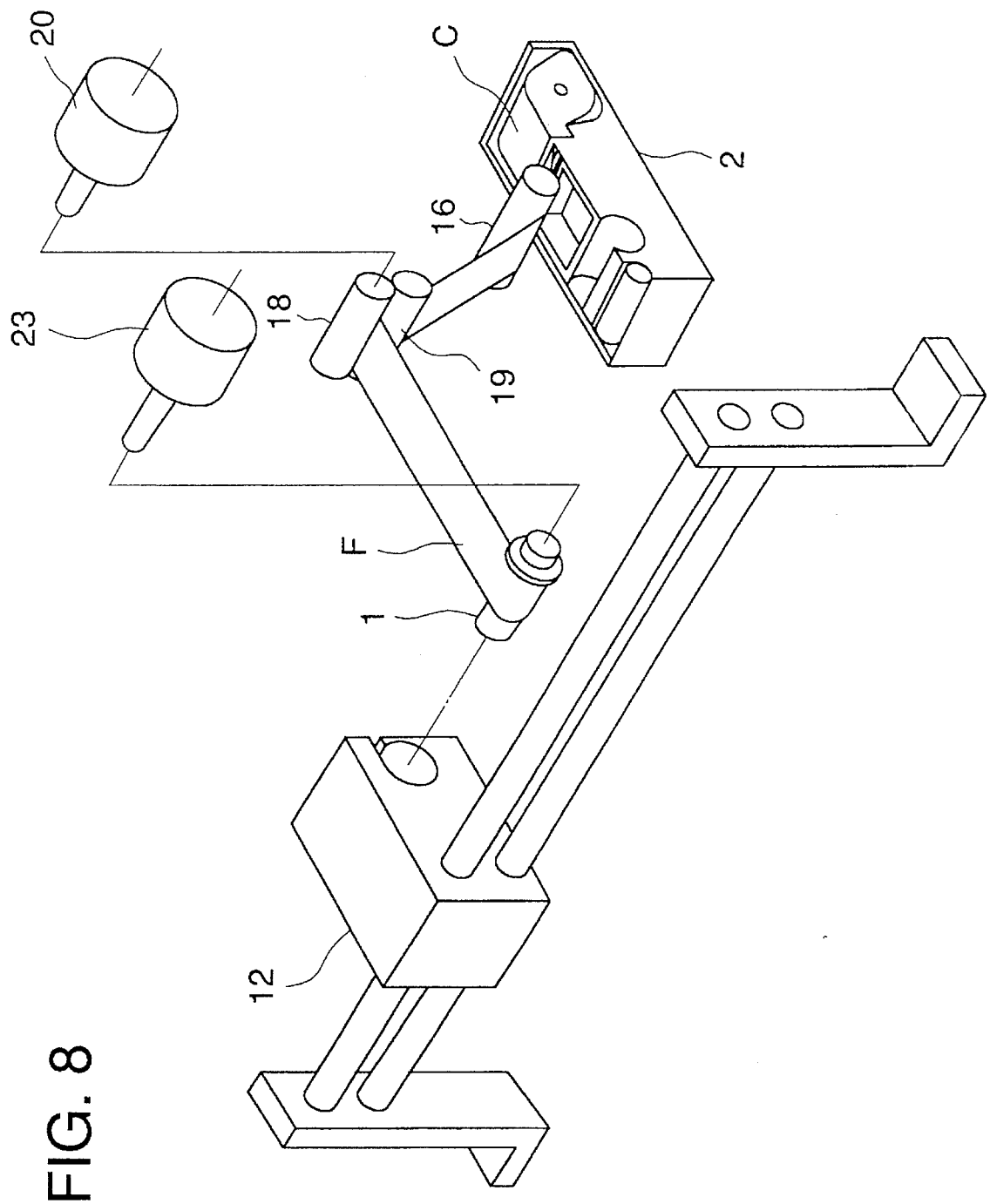
FIG. 8 is a perspective view of the fifth step.

In the fifth step, the first guide 17 and the second guide 21 are retreated as shown in a perspective view in FIG. 8, and camera main body 2 is positioned below cartridge C, then the cartridge C is lowered together with roller 16 so that the cartridge C can be loaded in cartridge chamber 2a of the camera main body 2. In this case, film take-up spool C2 is engaged with an unillustrated film take-up shaft in the camera main body 2, and key C5 is engaged with light-shielding cover opening/closing shaft in the camera main body 2.

Incidentally, though this light-shielding cover opening/closing shaft is for closing light-shielding cover C4 of cartridge C before taking out the cartridge C, the light-shielding cover opening/closing shaft is not needed when a film is taken out in a dark room.

Figure 9:
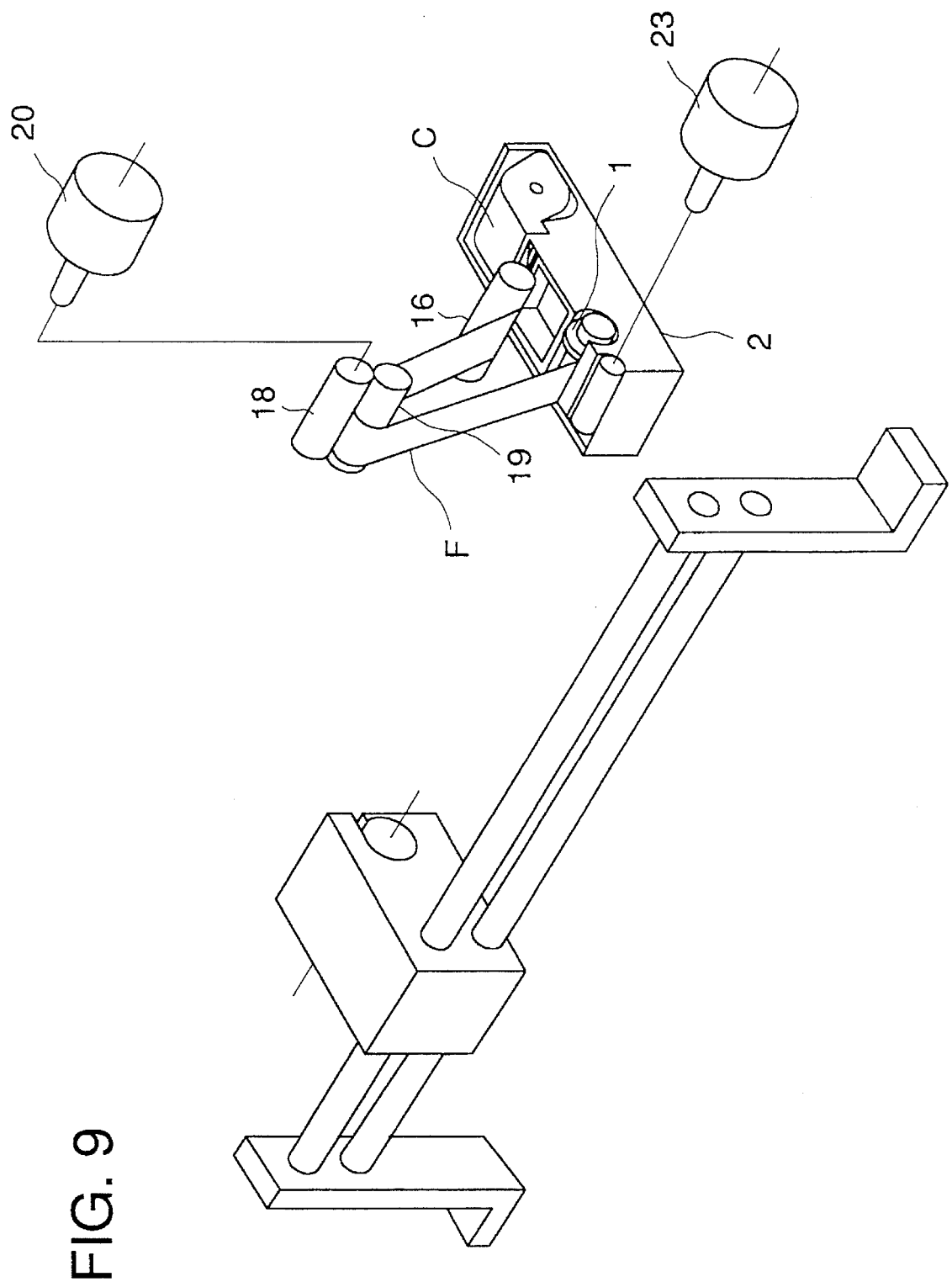
FIG. 9 is a perspective view of the sixth step.
Figure 10:
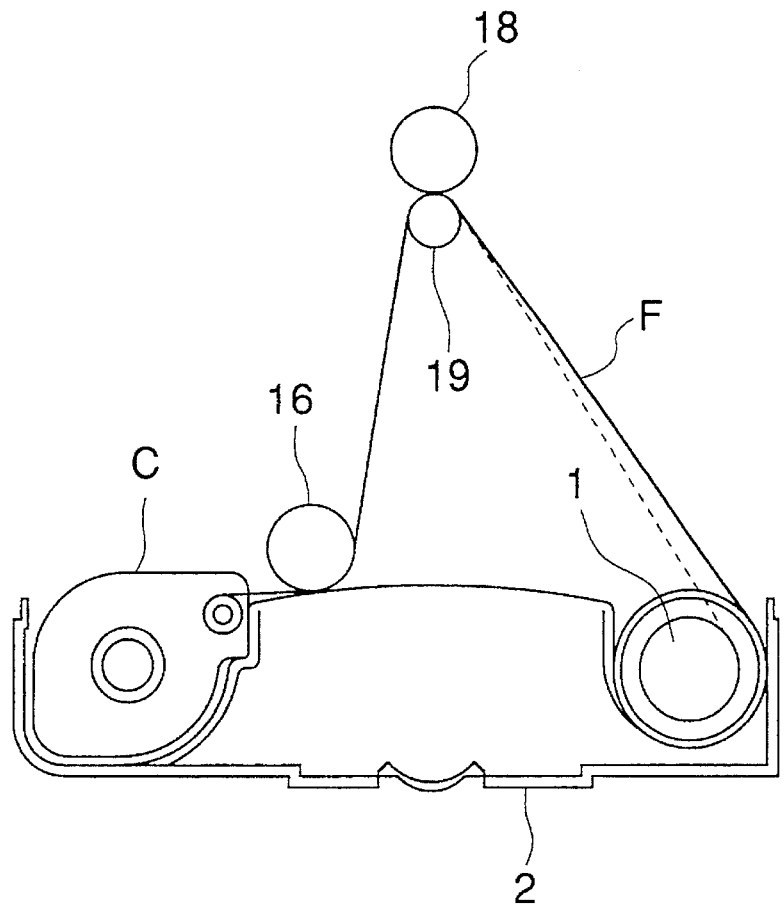
FIG. 10 is a top view of the sixth step.

In the sixth step, film supplying spool 1 around which a predetermined length of film F is wound is also lowered as shown on a perspective view in FIG. 9 and on a top view in FIG. 10 to be loaded in film chamber 2b in camera main body 2. After that, motor 23 is driven so that the film may be wound as completely as possible through roller 16, nip rollers 18 and 19. This film winding is called tertiary film winding. The reason why film F is taken up outside camera main body 2 as stated above is that damages or scratches on the film are feared when the film is taken up inside the camera main body 2 because of high speed film winding.

Figure 11:
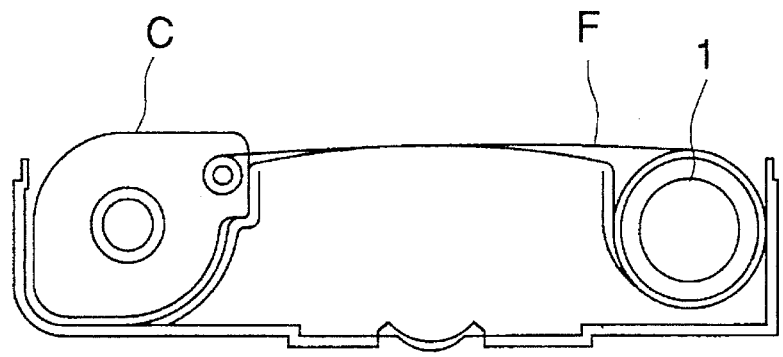
FIG. 11 is a top view of the seventh step.

In the seventh step, the slack of the film generated by winding outside the camera main body is eliminated in the camera main body 2 by winding the film with film supplying spool 1, after roller 16 and nip rollers 18 and 19 are retreated, as shown on a plan view in FIG. 11. This film winding is called quaternary film winding. After that, motor 23 is also retreated.

Figure 12:
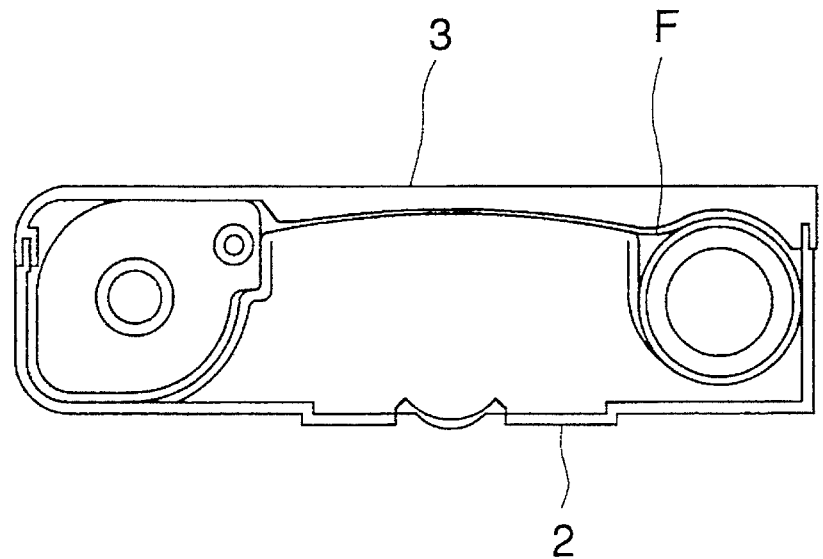
FIG. 12 is 9 top view of the eighth step.
Figure 13:
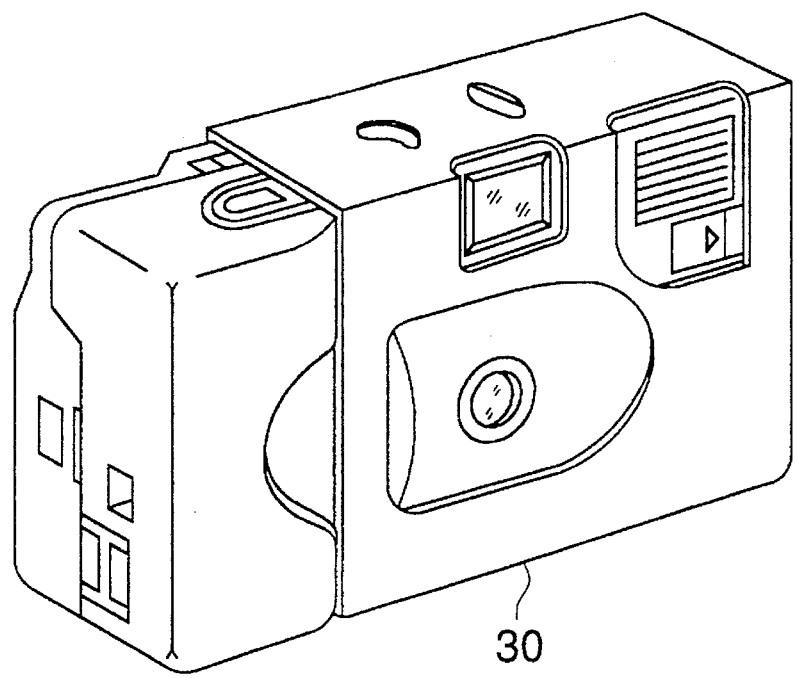
FIG. 13 is a perspective view of a lens-fitted film unit completed.

In the eighth step, rear cover 3, a cartridge cover and a film winding shaft cover are mounted and film F is held on a light-tight basis as shown on a top view in FIG. 12.

At this moment, the film loading steps end. After that, the camera main body is covered by paper cover 30 on which a company name and a brief instruction for use are printed to be a finished lens-fitted film unit shown on a perspective view in FIG. 13.

Incidentally, in the lens-fitted film unit explained above, a film supplying spool is used even in the finished product, but it is also possible not to use a film supplying spool by using a jig.

Figure 14:
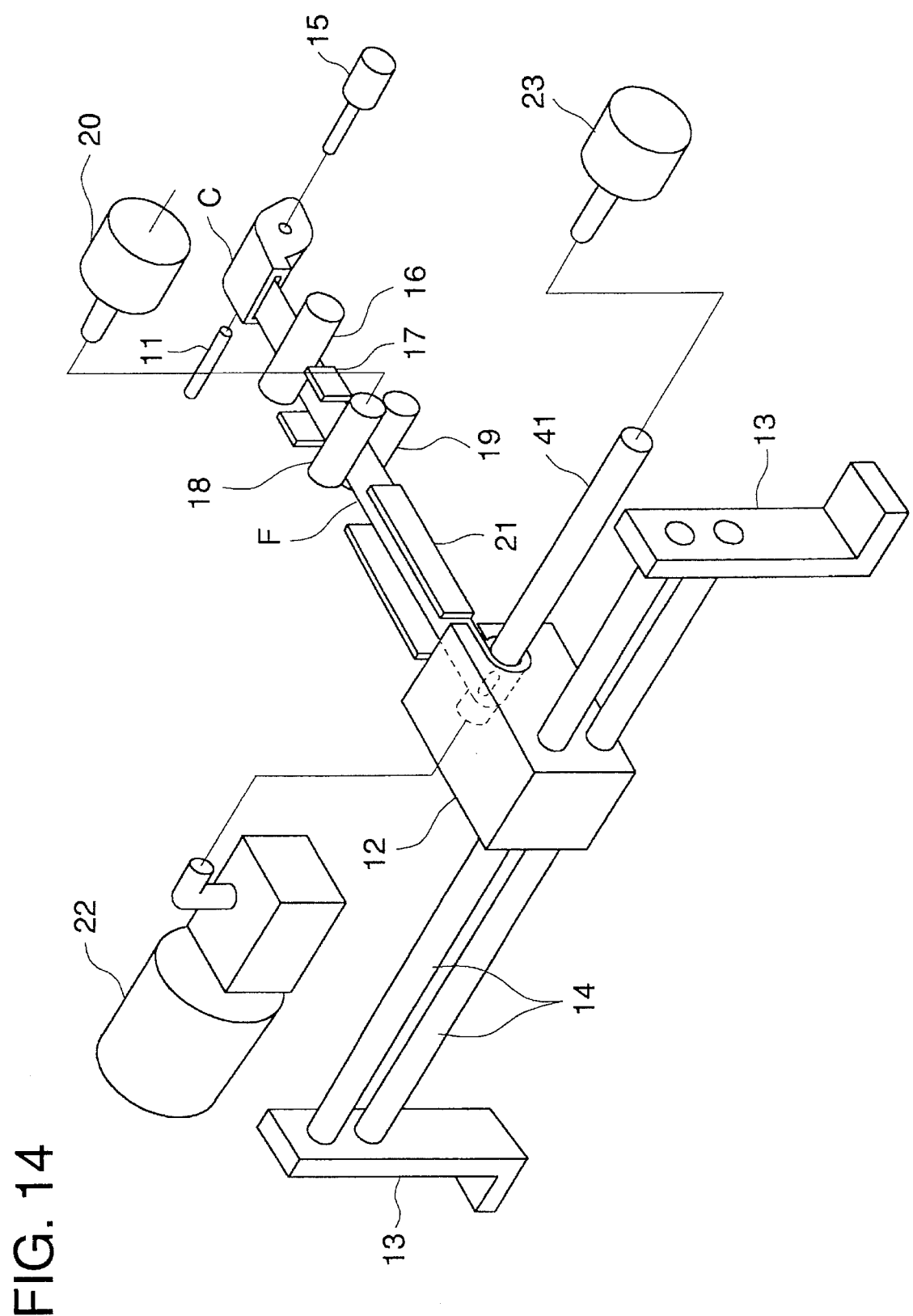
FIG. 14 is a perspective view of the third step wherein a film supplying spool is not used.

FIG. 14 represents a perspective view of the third step which is the same as that in FIG. 5 except the only difference that film supplying spool 1 in FIG. 5 is replaced with spindle 41 in FIG. 14. On the spindle 41, there are bored the same suction holes as those on the film supplying spool 1, and when vacuum pump 22 is operated, air is sucked through suction holes communicated with a hollow hole provided on the axis of the spindle 41. When the spindle 41 is rotated by motor 23, a leading edge of the film F is attracted easily to the suction holes to be wound around the spindle 41.

Incidentally, after that, the spindle 41 may be removed, following the seventh step after passing the steps similar to those mentioned above. Namely, after that, film F wound in the film chamber 2b is not further taken up even if the spindle 41 representing a film winding shaft for film F does not exist, which means that the film winding shaft is not necessary.

The eighth step and thereafter are the same as those described above.

Incidentally, a method for attracting a film on a film supplying shaft by operating a vacuum pump and by sucking air through suction holes communicated with a hollow hole provided on the axis of the film supplying shaft as stated above can be applied not only to the film loading step for a lens-fitted film unit but also to a film winding method in a film manufacturing step and a film processing step.

Furthermore, the above-mentioned method can be applied to a film whose leading edge is perforated, and to a film whose leading edge is not perforated to be sure.

The invention makes it possible to wind a film around a film supplying spool without catching perforations at the leading edge of the film with a claw or without folding the leading edge of the film. After that, therefore, the film taken in the cartridge can easily be fed out, which means that the method of the invention is especially suitable for winding up the film whose leading edge is not perforated.

What is claimed is:

1. A method for loading an unexposed photographic film in a lens-fitted photographic film unit, the method comprising the steps of:

(a) providing a cartridge storing the unexposed film therein, and a film supplying spool having a film winding part around which the film is wound, a portion defining a suction hole for film-attraction formed on the film winding part, and a portion defining a hollow hole for air-suction formed concentrically with the supplying spool;

(b) thrusting out the film from the cartridge;

(c) sucking air from the hollow hole so that the film thrust out from the cartridge is attracted to the suction hole;

(d) winding up the film by a predetermined length to the supplying spool while attracting the film to the suction hole; and (e) loading the cartridge and the supplying spool in a main body of the lens-fitted photographic film unit.

2. The method of claim 1 further comprising the steps of:

between said steps (b) and (c), covering the supplying spool by a film guide having an inner diameter more than an outer diameter of the film winding part of the supplying spool so as to guide the film;

rotating a film take-up spool provided in the cartridge so that a leading edge of the film is inserted into the film guide; and after said step (d), retreating the film guide from the supplying spool, and pressing the wound film with a touch roller to hold the film, and then stopping said sucking air from the hollow hole.

3. The method of claim 1 further comprising the step of rotating the supplying spool loaded in the main body so that the film is wound up to the supplying spool, after said step (e).

4. The method of claim 1 further comprising the steps of:

after said step (e), rotating the supplying spool loaded in the main body so that the film is wound up to the supplying spool through an external portion of the main body; and rotating the supplying spool loaded in the main body so that the film loosened outside the main body is wound up inside the main body.

5. The method of claim 1 further comprising the step of mounting external packing member to the main body to keep the film on a light-tight basis, after said step (e).

6. The method of claim 1, wherein an area of the suction hole is not less than 0.1 cm$^2$ and not more than 1.2 cm$^2$.

7. The method of claim 1, wherein said thrusting out is carried out by opening a light-shielding cover of the cartridge and then rotating a film take-up spool provided in the cartridge.

8. The method of claim 1, wherein said loading is carried out by engaging a take-up spool in the cartridge with a film take-up shaft provided in the main body.

9. A method for loading an unexposed photographic film in a lens-fitted photographic film unit, the method comprising the steps of:

(a) providing a cartridge storing the unexposed film therein, and a film supplying spool having a film winding part around which the film is wound, a portion defining a suction hole for film-attraction formed on the film winding part, and a portion defining a hollow hole for air-suction formed concentrically with the supplying spool;

(b) in a darkroom, opening a light-shielding cover of the cartridge, and covering the supplying spool by a film guide having an inner diameter more than an outer diameter of the film winding part of the supplying spool so as to guide the film;

(c) in the darkroom, rotating a film take-up spool provided in the cartridge to thrust out the film from the cartridge, then inserting a leading edge of the film into the film guide, then sucking air from the hollow hole thereby attracting the leading edge of the film to the suction hole, and then rotating the supplying spool while attracting the leading edge of the film to the suction hole so that the film is wound up to the supplying spool by a predetermined length;

(d) in the darkroom, retreating the film guide from the supplying spool, and pressing the wound film with a touch roller to hold the film and then rotating the supplying spool so that the film is further wound up to the supplying spool by a prescribed length and then stopping said sucking air from the hollow hole;

(e) in the darkroom, loading the cartridge in a main body of the lens-fitted photographic film unit so that the film take-up spool in the cartridge is engaged with a film take-up shaft provided in the main body;

(f) in the darkroom, loading the supplying spool in the main body of the unit, and then rotating the supplying spool loaded in the main body so that the film is wound up to the supplying spool through an external portion of the main body;

(g) in the darkroom, rotating the supplying spool loaded in the main body so that the film loosened outside the main body is wound up inside the main body; and (h) mounting external packing member to the main body to keep the film on a light-tight basis.

* * * * *